United States Patent
Pilney

(10) Patent No.: US 10,258,028 B2
(45) Date of Patent: Apr. 16, 2019

(54) SPRAYER BOOM WITH PERFORATED OUTER WALLS

(71) Applicant: CNH Industrial America LLC, New Holland, PA (US)

(72) Inventor: Brian J. Pilney, West Bend, WI (US)

(73) Assignee: CNH Industrial America LLC, New Holland, PA (US)

(*) Notice: Subject to any disclaimer, the term of this patent is extended or adjusted under 35 U.S.C. 154(b) by 122 days.

(21) Appl. No.: 15/131,348

(22) Filed: Apr. 18, 2016

(65) Prior Publication Data

US 2016/0309696 A1    Oct. 27, 2016

Related U.S. Application Data

(60) Provisional application No. 62/153,204, filed on Apr. 27, 2015.

(51) Int. Cl.
*A01M 7/00* (2006.01)
*A01C 23/00* (2006.01)

(52) U.S. Cl.
CPC .......... *A01M 7/0057* (2013.01); *A01C 23/008* (2013.01)

(58) Field of Classification Search
CPC .. A01M 7/0078; A01M 7/006; A01M 7/0071; A01M 7/0075; A01M 7/0057; A01M 7/0053; A01C 23/008; A01C 23/00; E04C 2003/043; E04C 2003/0413; E04C 2003/0469; E04C 2003/0421; E04C 2003/0434; E04C 2003/0447; E04C 2003/0486; E04C 2003/0491; Y10T 29/49625; B05B 13/005

USPC .......................................................... 239/159
See application file for complete search history.

(56) References Cited

U.S. PATENT DOCUMENTS

| | | |
|---|---|---|
| 5,871,305 A | 2/1999 | Allen |
| 6,719,213 B1 | 4/2004 | Ferguson |
| 6,789,746 B2 | 9/2004 | Guesdon |
| 6,837,446 B1 * | 1/2005 | Jesse .................... A01C 23/008 239/159 |
| 6,966,501 B2 * | 11/2005 | Wubben .............. A01M 7/0071 239/168 |
| 7,073,735 B2 * | 7/2006 | Wubben .............. A01M 7/0053 239/722 |
| 7,669,784 B2 | 3/2010 | Sobolik |
| 8,573,510 B2 | 11/2013 | Bisson et al. |
| 8,746,589 B2 | 6/2014 | Barker et al. |
| 8,939,383 B2 | 1/2015 | Honemann |
| 2006/0201075 A1 | 9/2006 | Rivas |
| 2014/0366460 A1 | 12/2014 | Peters et al. |

FOREIGN PATENT DOCUMENTS

GB    2098842    12/1982

* cited by examiner

*Primary Examiner* — Alexander M Valvis
*Assistant Examiner* — Christopher R Dandridge
(74) *Attorney, Agent, or Firm* — Rebecca L. Henkel; Rickard K. DeMille

(57) ABSTRACT

A sprayer boom for use with an agricultural sprayer has perforated outer walls. The perforated outer walls may connect boom frame tube stringers to each other by way of stringer connecting plates with cutouts. The perforated outer walls may be defined by webs of material extending between the tube stringers and multiple openings defined between the webs of material.

12 Claims, 4 Drawing Sheets

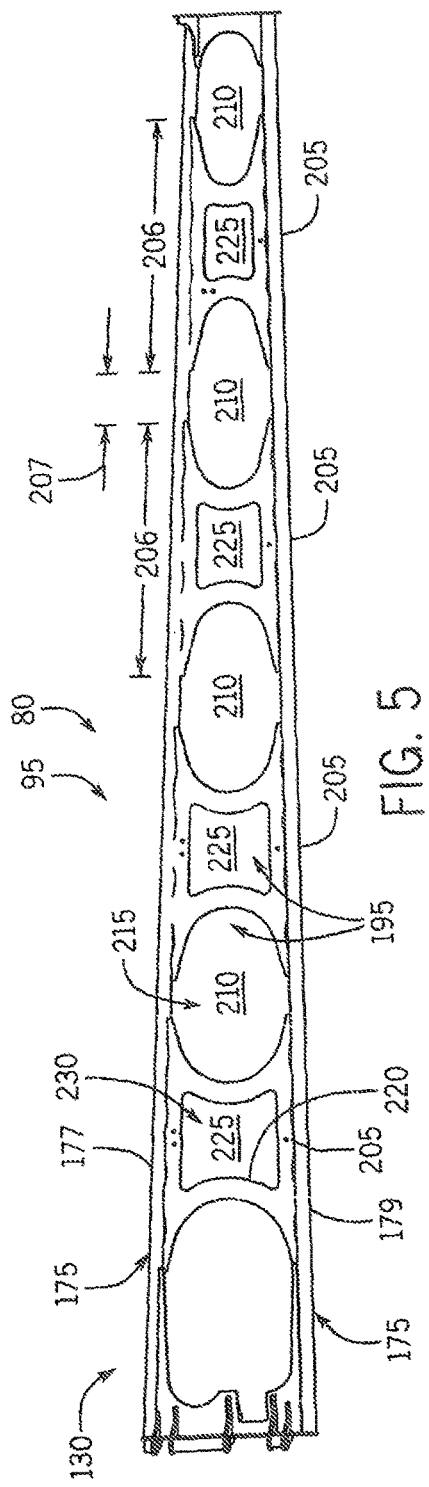
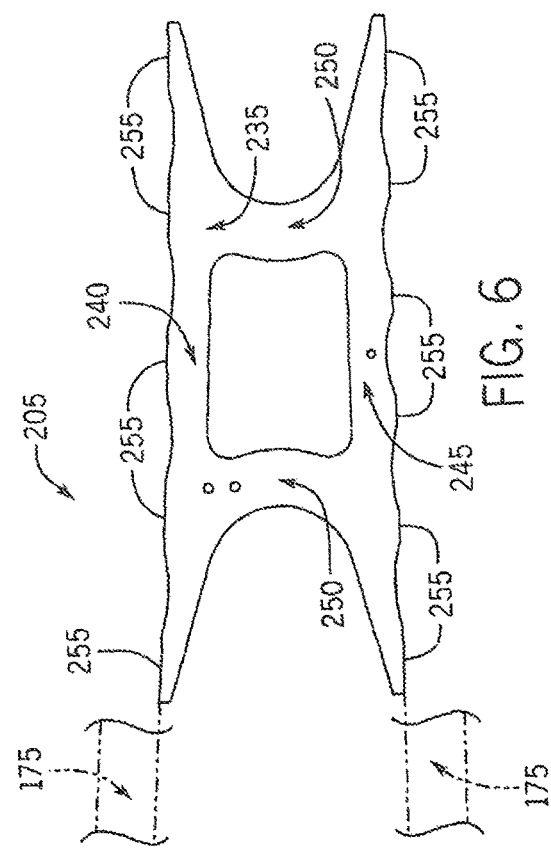

SPRAYER BOOM WITH PERFORATED OUTER WALLS

CROSS-REFERENCE TO RELATED APPLICATION

The present application claims the benefit of U.S. Ser. No. 62/153,204 filed Apr. 27, 2015.

FIELD OF THE INVENTION

The invention relates generally to agricultural product application equipment such as self-propelled agricultural sprayers and in particular, to a sprayer boom with perforated outer walls which may include stringer connecting plates with cutouts.

BACKGROUND OF THE INVENTION

Trellis-style boom segments can require a lot of labor to fabricate because they can have a lot of individual components that each requires fit-up, bolting and welding. Plus, trellis-style boom segments have stress points at intersections between frame tube stringers and angularly arranged brace segments. Over time, booms on sprayers have gotten longer to increase machine efficiency. Longer booms require more material resulting in heavier segments. The heavier boom segments can introduce substantially large forces at the stress points. This is especially true when operating at high travel speeds or on uneven terrain causing the booms to flex more. Use-induced cycling of these larger forces can lead to weld failure or bending or other failures of weldment components or materials at or near the stress points.

SUMMARY OF THE INVENTION

An optimal sprayer boom for an agricultural sprayer is lightweight, durable, and is uncomplicated to assemble.

According to one aspect of the invention, the sprayer boom has frame tube stringers and perforated outer walls that interconnect respective pairs of boom flame tube stringers. Each of the perforated outer walls may be defined by stringer connecting plates with cutouts. The perforated outer walls can include webs of material extending between the pair of tube stringers and multiple openings defined between the webs of material. The perforated outer wall can define an outer wall presenting a discontinuous outer surface(s) of the boom segment. The perforated outer walls are configured to distribute bending loads and other forces over large areas of the boom frame tube stringers and provide boom sidewalls with the discontinuities defined by spaces or openings of cutouts that provide access into an open interior of the boom.

According to another aspect of the invention, the perforated outer wall is of multi-component construction. The perforated outer wall can include multiple plates in coplanar alignment and non-coplanar with each other to define the exterior surface of the perforated outer wall.

According to another aspect of the invention, the boom has boom segments with frame tube stringers connected to each other with webs of sheet, such as plate material, as side plates. The side plates collectively define outer walls of the boom segment(s) that extend about a periphery of a continuously open longitudinally extending interior space of the boom. Each outer wall is made from multiple adjacent side plates, each having a cutout and aligned in along the stringers that interconnects a respective pair of frame tube stringers.

According to another aspect of the invention, at each boom segment, the outer walls defined by side plates connect the frame tube stringers to each other through large surface areas. This spreads out the forces experienced by the boom through large areas of the boom segment without points of three concentration at intersections between frame tube stringers and angularly arranged braces. The cutouts of the side plates provide access into the interior space of the boom, allowing for servicing of plumbing or other components that may be routed or housed inside the interior space of the bourn segment. The cutouts of the side plates also reduce the weight of the assembled boom segment.

According to another aspect of the invention, a distance between each adjacent pair of the multiple plates is smaller than a width dimension of each of the multiple plates. The outer walls may be substantially open. Surfaces of the multiple plates of each of the multiple outer walls may cover less than one-half of an area defined between the respective pair of boom frame stringers and the multiple openings may occupy greater than one-half of the area defined between the respective pair of boom frame stringers. The openings may define inter-plate spaces as a first set of openings between adjacent plates and at least one or each of the plates has a cutout defining an intra-plate space as a second set of openings in the plates.

According to another aspect of the invention, at least one of the plates may have an upper bar segment extending parallel and connected to one of the frame tube stringers and a lower bar segment extending parallel and connected to another frame tube stringer. A pair of side bar segments may extend between and connect the upper and lower bar segments to each other. Inner edges of the upper, lower, and side bar segments of at least one or each of the plates may extend about an opening defining an intra-plate space of the plate(s). The side bar segments of the plate(s) may extend along curved paths between the upper and lower bar segments. The side bar segments of the plate(s) may curve inwardly toward each other from the upper and lower side bar segments. At least one of the plates may include an upper bar segment with an outer portion defining elongate tabs configured to engage the respective frame tube stringer. A lower bar segment may define an outer portion with elongate tabs configured to engage another frame tube stringer.

According to another aspect of the invention, the frame tube stringers are defined by an upper frame tube stringer and a pair of lower frame tube stringers that are arranged with respect to each other to define a triangular cross-sectional perimeter shape of the sprayer boom. The promoter walls may include an outer lower wall and a pair of outer upper walls extending between the upper frame tube stringer and the pair of lower frame stringers. The outer upper walls may be substantially open. Each outer upper wall may define inter-plate spaces as a first set of openings between adjacent plates and the plates may have cutouts defining intra-plate spaces as a second set of openings in the plates.

According to another aspect the invention, a self-propelled agricultural sprayer vehicle is provided with a chassis including a chassis frame. The chassis frame includes wheels rotatable for moving the self-propelled agricultural sprayer vehicle, a product storage tank for storing a volume of product, an engine, a hydraulic system receiving power from the engine and delivering power for rotating the wheels, and a spraying system receiving power from the engine for conveying product stored in the product storage tank to spray nozzles delivering the product onto an agricultural field. A boom extends transversely from the chassis frame and supports the spray nozzles. The boom may have multiple boom segments, at least one which may include multiple frame tube stringers extending in a common direction and outer walls arranged at an exterior of the boom segment. Each of the outer walls may include adjacent plates interconnecting a respective pair of the multiple frame tube stringers. The outer walls may collectively extend about a substantially continuously open interior passage of the boom segment.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 5 is a front elevation of the boom segment of FIG. 3; and

FIG. 6 is a front elevation of a plate of the boom segment of FIG. 3.

DETAILED DESCRIPTION OF THE PREFERRED EMBODIMENTS

Figure 1:
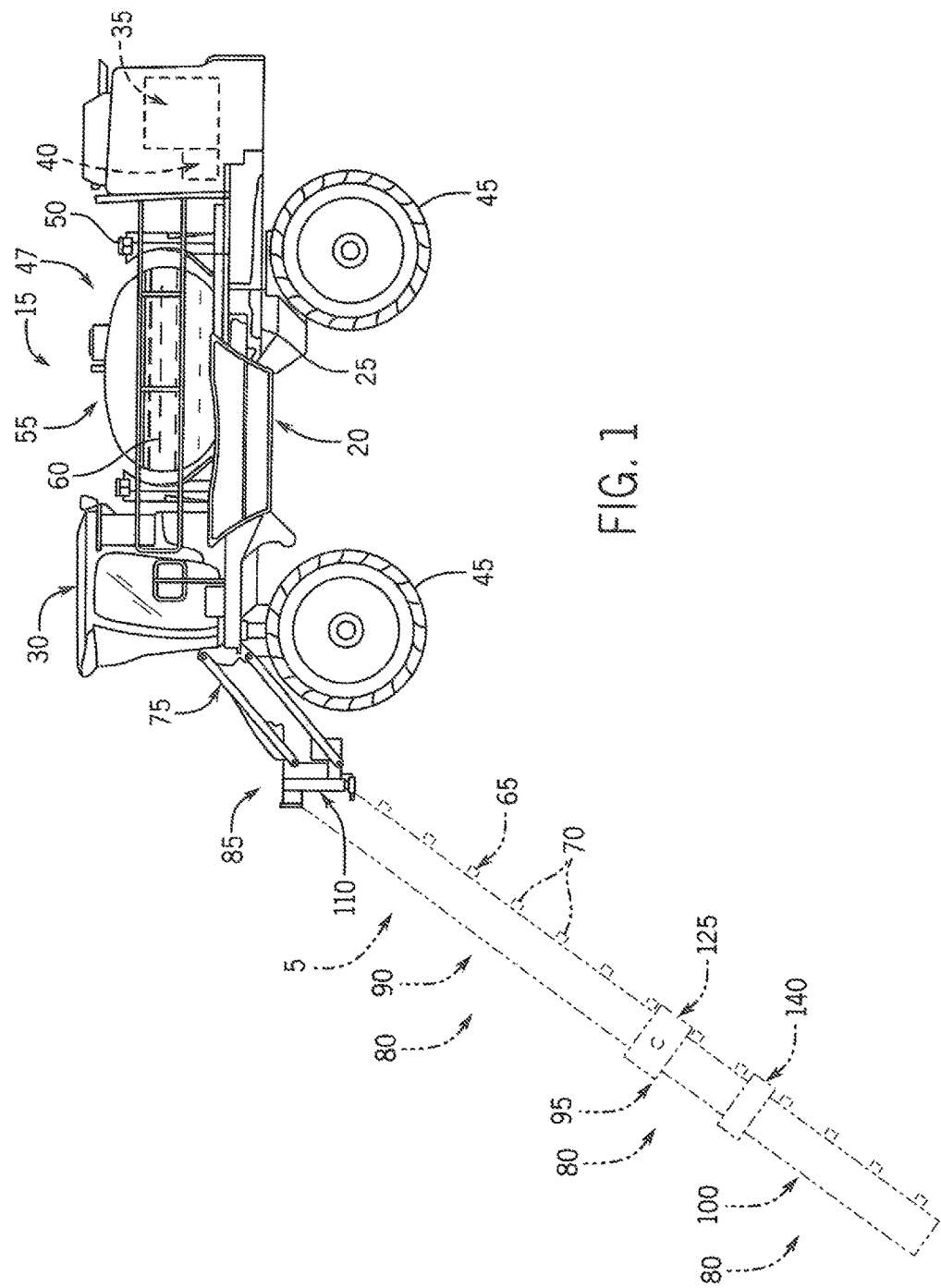
FIG. 1 is a side elevation of a self-propelled sprayer with a sprayer boom according to the present invention.

Referring now to the drawings and specifically to FIG. 1, a sprayer boom 5 with perforated outer walls, which may be defined by stringer connecting plates with cutouts as explained in greater detail elsewhere herein, is shown for use with an agricultural sprayer. The agricultural sprayer is shown here as a self-propelled agricultural sprayer vehicle or self-propelled sprayer 15. Although sprayer 15 is shown as a front-mounted boom self-propelled sprayer, it is understood that self-propelled versions of sprayer 15 can be have either front-mounted or rear-mounted booms, such as those available from CNH Industrial, including the Miller Nitro and Condor Series sprayers and New Holland Guardian Series sprayers.

Still referring, to FIG. 1, sprayer 15 includes chassis 20 having chassis frame 25 that supports various assemblies, systems, and components. These various assemblies, systems, and components include cab 30, engine 35, and hydraulic system 40. Hydraulic system 40 receives power from engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from engine 35 and delivers power for rotating wheels 45 by way of power-transmitting driveline components such as drive shafts, differentials, and other gear sets in portal, drop boxes, or other housings. Spray system 47 includes storage containers such as rinse tank 50 storing water or a rinsing solution and product tank 55 that stores a volume of product 60 for delivery onto an agricultural field with sprayer 15. A product delivery pump conveys product 60 from product tank 55 through plumbing components such as interconnected pieces of tubing and through a boom tubing system 65 for release out of sprayer nozzles 70 that are spaced from each another along the width of boom 5 during spraying operations of sprayer 15. Boom 5 is connected to chassis 20 with lift arm assembly 75 that is configured to move the boom 5 up and down for adjusting the height of application of the product 60.

Figure 2:
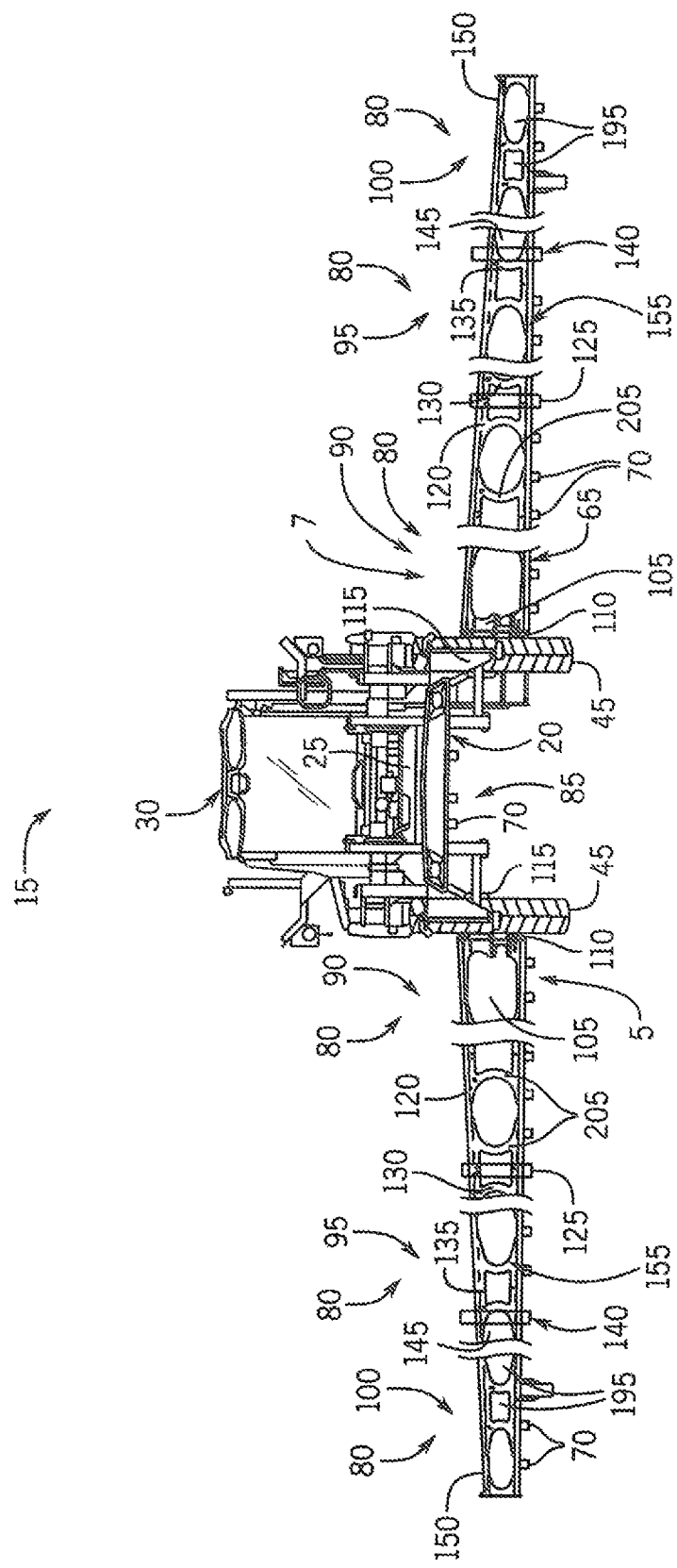
FIG. 2 is a front elevation of a self-propelled sprayer with a sprayer boom according to the present invention.

Referring now to FIG. 2, boom 5 includes a center section and left and right boom arms collectively defined by multiple boom segments 80 connected longitudinally to provide the corresponding width of the assembled boom 5. Boom segments 80 include center section 85 and pairs of primary boom segments 90, secondary boom segments 95, and breakaway boom segments 100 extending in opposite directions mirrored about a longitudinal axis of the sprayer 15 along the left and right boom arms. The corresponding left and right segments of the pairs of primary, secondary, and breakaway boom segments 90, 95, 100 are substantially identical, so only one will be described, with the description applying to both the left and right segments. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 5 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. There are numerous was to fold the boom that include horizontal and vertical or any combination in between. For folding of secondary and breakaway segments 95, 100 against the primary boom segment 90, the hinge 125 allows pivoting of the secondary and breakaway segments 95, 100 toward primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored position of boom 5, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15.

Figure 3:
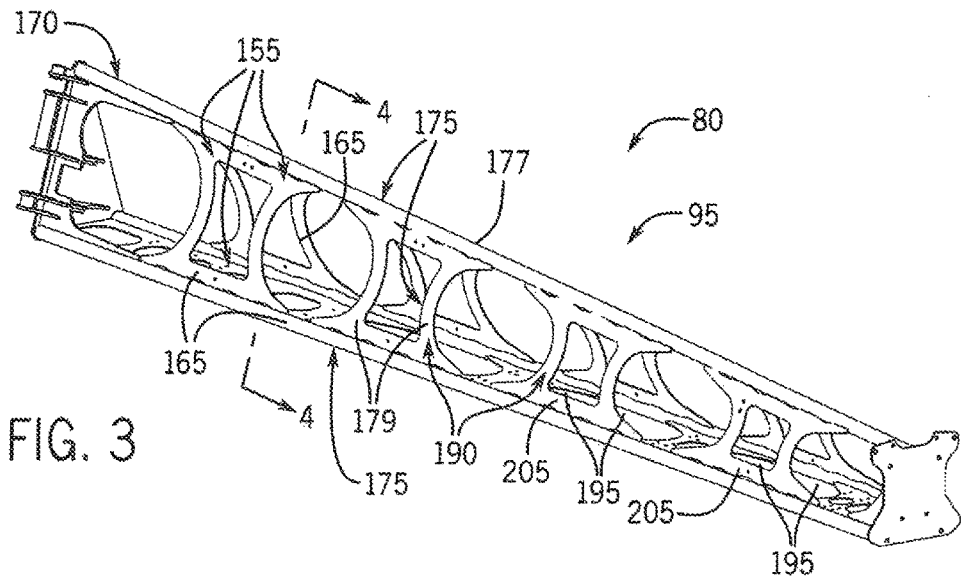
FIG. 3 is a pictorial view of a boom segment according to the invention.

Referring now to FIG. 3, boom segment 80 is shown as secondary boom assembly 95 with perforated outer walls 155, although it is understood that perforated outer walls 155 may be incorporated into the other boom segments 80 such as the primary or breakaway boom segments 90, 100. Perforated outer walls 155 define a discontinuous outer surface(s) 165 of frame 170 of boom segment 80. Frame 170 includes multiple pieces of tubing as frame tube stringers 175 and the perforated outer walls 155 are configured to distribute bending loads and other forces over large areas through the frame 170 and thus distributing threes through boom segment 80.

Figure 4:
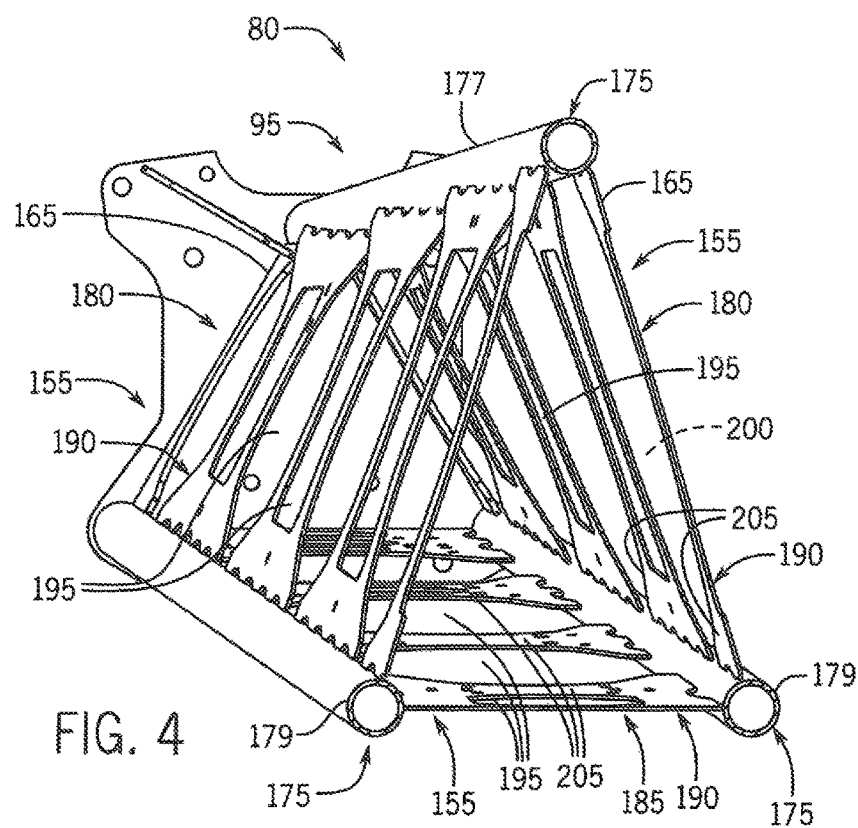
FIG. 4 is a cross-sectional view of the boom segment of FIG. 3.

Referring now to FIG. 4, frame tube stringers 175 are defined by an upper frame tube stringer 177 and a pair of lower frame tube stringers 179 that are arranged with respect to each other to define a triangular cross-sectional perimeter shape of boom segment 80. Perforated outer walls 155 define two outer upper walls 180 and outer lower wall 185. Referring again to FIG. 3, perforated outer walls 155 provide a discontinuous surface with webs 190 of material interrupted by discontinuities defined by spaces or openings 195, explained in greater detail elsewhere herein. The outer walls 155 are substantially open, such as more than one-half of the area defined between the respective boom frame stringers 175 covered by openings 195 and less than one-half covered by webs 190 of material. Openings 195 of perforated outer walls 155 provide access into an open interior 200 of the boom defined inwardly of the frame tube stringers 175 and perforated outer walls 155. The frame can also be inverted to have two upper stringers and one lower.

Still referring to FIG. 4, the webs 190 of material are defined by multiple plates 205 in coplanar alignment with each other to define the exterior or outer surface 165 of each of the outer walls 155. Referring now to FIG. 5, adjacent plates 205 are arranged close to each other, with a distance between adjacent plates 205 being smaller than a width dimension of each of the plates 205. Width dimensions of plates 205 are represented by arrows 206 and distances between adjacent plates 205 are represented by space 207. The openings 195 define inter-plate spaces 210 as a first set 215 of openings between adjacent pairs of the plates 205. The plates 205 have cutouts 220 defining intra-plate spaces 225 as a second set 230 of openings in the plates 205 themselves.

Referring now to FIG. 6, each plate 205 defines a substantially open framework 235 of multiple interconnected segments that are shown with an hour-glass perimeter shape. Upper and lower bar segments 240, 245 extend generally parallel to each other and the respective frame tube stringers 175 to which the upper and lower bar segments 240, 245 connect. A pair of side bar segments 250 connect the upper and lower bar segments 240, 245 to each other. The side bar segments 250 extend along curved paths between the upper and lower bar segments 240, 245, curving inwardly toward each other. Tabs 255 are defined at outermost portions of the upper and lower bar segments 240, 245. Tabs 255 provide base material for welding to frame tube stringers 175 during assembly of boom 5.

Many changes and modifications could be made to the invention without departing from the spirit thereof. The scope of these changes will become apparent from the appended claims.

We claim:

1. A sprayer boom with perforated outer walls for an agricultural sprayer, the sprayer boom comprising:u
    a boom frame having multiple frame tube stringers extending in a common direction; and
    multiple outer walls with each outer wall interconnecting a corresponding pair of tube stringers of the multiple frame tube stringers and being defined by a plurality of plates positioned adjacent one another in co-planar alignment, each of the plurality of plates includes:
        a first bar segment operatively connected to a first tube stringer of the pair of tube stringers;
        a second bar segment operatively connected to a second tube stringer of the pair of tube stringers;
        a first side bar interconnecting the first bar segment and the second bar segment, the first side bar including:
            a concave outer edge extending between the first bar segment and the second bar segment; and
            a convex inner edge extending between the first bar segment and the second bar segment;
        a second side bar lying in a common plane with the first side bar and interconnecting the first bar segment and the second bar segment, the second side bar including:
            a concave outer edge extending between the first bar segment and the second bar segment; and
            a convex inner edge extending between the first bar segment and the second bar segment;
    wherein:
        the convex inner edge of the first side bar is directed towards the convex inner edge of the second side bar; and
        the concave outer edge of the second side bar of a first one of the plurality of plates is directed towards the concave outer edge of the first side bar of a second one of the plurality of plates adjacent to the first one of the plurality of plates.

2. The sprayer boom of claim 1, wherein inner edges of the first and second side bar segments and the concave inner edges of the first and second side bars of each of the plurality of plates extend about an opening defining an intra-plate space of the at least one of the plurality of plates.

3. The sprayer boom of claim 2, wherein the first and second side bars of the plurality of plates extend along curved paths between the first and second bar segments.

4. The sprayer boom of claim 3, wherein the first and second side bars of the plurality of plates curve inwardly toward each other from the first and second bar segments.

5. The sprayer boom of claim 1 wherein the first bar segment includes an outer portion defining elongate tabs configured to engage a first one of the multiple frame tube stringers; and
    the second bar segment includes an outer portion defining elongate tabs configured to engage a second one of the multiple frame tube stringers.

6. The sprayer boom of claim 5 wherein the multiple frame tube stringers are defined by an upper frame tube stringer and a pair of lower frame tube stringers that are arranged with respect to each other to define a triangular cross-sectional perimeter shape of the sprayer boom.

7. The sprayer boom of claim 6 wherein the multiple outer walls include an outer lower wall extending between the pair of lower frame tube stringers and a pair of outer upper walls extending between the upper frame tube stringer and the pair of lower frame stringers.

8. The sprayer boom of claim 7, wherein the outer upper walls are substantially open, with each outer upper wall defining inter-plate spaces as a first set of openings between adjacent ones of the plurality of plates and the convex inner edge of the first side bar and the convex inner edge of the second side bar of each of the plurality of plates defining intra-plate spaces as a second set of openings in the plurality of plates.

9. A sprayer boom with perforated outer walls for an agricultural sprayer, the sprayer boom comprising:

a boom frame having multiple frame tube stringers extending in a common direction; and multiple outer walls with each outer wall interconnecting a corresponding pair of tube stringers of the multiple frame tube stringers and being defined by a plurality of plates positioned adjacent one another in co-planar alignment, each of the plurality of plates includes:

a first bar segment operatively connected to a first tube stringer of the pair of tube stringers;

a second bar segment operatively connected to a second tube stringer of the pair of tube stringers;

a first side bar interconnecting the first bar segment and the second bar segment, the first side bar including:

a concave outer edge extending between the first bar segment and the second bar segment; and a convex inner edge extending between the first bar segment and the second bar segment;

a second side bar interconnecting the first bar segment and the second bar segment, the second side bar including:

a concave outer edge extending between the first bar segment and the second bar segment; and a convex inner edge extending between the first bar segment and the second bar segment;

wherein:

the convex inner edge of the first side bar is directed towards the convex inner edge of the second side bar;

the concave outer edge of the second side bar of a first one of the plurality of plates is directed towards the concave outer edge of the first side bar of a second one of the plurality of plates adjacent to the first one of the plurality of plates;

the convex inner edge of the first side bar and the convex inner edge of the second side bar in each of the plurality of plates define an opening in one of the multiple outer walls therebetween; and the concave outer edge of the second side bar of a first one of the plurality of plates and the concave outer edge of the first side bar of a second one of the plurality of plates adjacent to the first one of the plurality of plates define an opening in one of the multiple outer walls therebetween such that each outer wall has multiple openings therethrough.

10. The sprayer boom of claim 9, wherein the outer walls are substantially open with surfaces of the plurality of plates of each of the multiple outer walls covering less than one-half of an area defined between the respective pair of boom frame stringers and the multiple openings covering greater than one-half of the area defined between the respective pair of boom frame stringers.

11. A self-propelled agricultural sprayer vehicle, comprising:

a chassis including a chassis frame supporting,
wheels rotatable for moving the self-propelled agricultural sprayer vehicle;
a product storage tank for storing a volume of product;
an engine;
a hydraulic system receiving power from the engine and delivering power for rotating the wheels;
a spraying system receiving power from the engine for conveying product stored in the product storage tank to spray nozzles delivering the product onto an agricultural field; and
a boom extending transversely from the chassis frame and supporting the spray nozzles, the boom with multiple boom segments, wherein at least one of the multiple boom segments includes, multiple frame tube stringers extending in a common direction; and outer walls arranged at an exterior of the at least one of the multiple segments and each being defined by a plurality of adjacent plates interconnecting a respective pair of the multiple frame tube stringers with the outer walls collectively extending about a substantially continuously open interior passage of the at least one of the segments, each of the plurality of plates including:

a first bar segment operatively connected to a first tube stringer of the pair of multiple frame tube stringers;

a second bar segment operatively connected to a second tube stringer of the pair of multiple frame tube stringers;

a first side bar interconnecting the first bar segment and the second bar segment, the first side bar including:

a concave outer edge extending between the first bar segment and the second bar segment; and a convex inner edge extending between the first bar segment and the second bar segment;

a second side bar lying in a common plane with the first side bar and interconnecting the first bar segment and the second bar segment, the second side bar including:

a concave outer edge extending between the first bar segment and the second bar segment; and a convex inner edge extending between the first bar segment and the second bar segment;

wherein:

the convex inner edge of the first side bar is directed towards the convex inner edge of the second side bar; and the concave outer edge of the second side bar of a first one of the plurality of plates is directed towards the concave outer edge of the first side bar of a second one of the plurality of plates adjacent to the first one of the plurality of plates.

12. A self-propelled agricultural sprayer vehicle, comprising:

a chassis including a chassis frame supporting:
wheels rotatable for moving the self-propelled agricultural sprayer vehicle;
a product storage tank for storing a volume of product;
an engine;
a hydraulic system receiving power from the engine and delivering power for rotating the wheels;
a spraying system receiving power from the engine for conveying product stored in the product storage tank to spray nozzles delivering the product onto an agricultural field; and
a boom extending transversely from the chassis frame and supporting the spray nozzles, the boom with multiple boom segments, wherein at least one of the multiple boom segments includes:
multiple frame tube stringers extending in a common direction; and
outer walls arranged at an exterior of the at least one of the multiple segments and each being defined by a plurality of adjacent plates interconnecting a respective pair of the multiple frame tube stringers with the outer walls collectively extending about a substantially continuously open interior passage of the at least one of the segments, each of the plurality of plates including:
- a first bar segment operatively connected to a first tube stringer of the pair of multiple frame tube stringers;
- a second bar segment operatively connected to a second tube stringer of the pair of multiple frame tube stringers;
- a first side bar interconnecting the first bar segment and the second bar segment, the first side bar including:
  - a concave outer edge extending between the first bar segment and the second bar segment; and
  - a convex inner edge extending between the first bar segment and the second bar segment;
- a second side bar interconnecting the first bar segment and the second bar segment, the second side bar including:
  - a concave outer edge extending between the first bar segment and the second bar segment; and
  - a convex inner edge extending between the first bar segment and the second bar segment;

wherein:
- the convex inner edge of the first side bar is directed towards the convex inner edge of the second side bar;
- the concave outer edge of the second side bar of a first one of the plurality of plates is directed towards the concave outer edge of the first side bar of a second one of the plurality of plates adjacent to the first one of the plurality of plates;
- a first set of openings is defined as inter-plate spaces between the concave outer edge of the second side bar of one of the plurality of plates and the concave outer edge of the first side bar of an adjacent one of the plurality of plates; and
- a second set of openings is defined as intra-plate spaces by the convex inner edge of the first side bar and the convex inner edge of the second side bar of the plurality of plates.

* * * * *